(12) United States Patent
McGonigle et al.

(10) Patent No.: US 7,562,669 B2
(45) Date of Patent: Jul. 21, 2009

(54) CHECK VALVE STOP ASSEMBLY AND METHOD OF RETENTION

(75) Inventors: G. Stephen McGonigle, Gilbert, AZ (US); Jeremiah J. Warriner, Laveen, AZ (US); Joseph J. Jira, Laveen, AZ (US)

(73) Assignee: Honeywell International Inc., Morristown, NJ (US)

( * ) Notice: Subject to any disclaimer, the term of this patent is extended or adjusted under 35 U.S.C. 154(b) by 244 days.

(21) Appl. No.: 11/497,015

(22) Filed: Jul. 31, 2006

(65) Prior Publication Data

US 2008/0023080 A1 Jan. 31, 2008

(51) Int. Cl.
*F16K 15/03* (2006.01)
*F16K 51/00* (2006.01)

(52) U.S. Cl. ............ 137/15.18; 137/512.1; 137/315.16; 251/286

(58) Field of Classification Search ............... 137/15.17, 137/15.18, 315.33, 315.16, 512.15, 512; 251/284, 286
See application file for complete search history.

(56) References Cited

U.S. PATENT DOCUMENTS

| | | | | |
|---|---|---|---|---|
| 2,877,792 | A * | 3/1959 | Tybus | 137/512.1 |
| 3,538,946 | A | 11/1970 | Hilsheimer | |
| 4,004,425 | A * | 1/1977 | Pickering | 60/562 |
| 4,079,751 | A | 3/1978 | Partridge et al. | |
| 4,230,148 | A | 10/1980 | Ogle, Jr. | |
| 4,257,451 | A | 3/1981 | Paton | |
| 4,445,533 | A * | 5/1984 | DeFrees | 137/512.1 |
| 4,694,853 | A | 9/1987 | Goodwin | |
| 4,774,981 | A | 10/1988 | Mizusawa | |
| 4,867,199 | A | 9/1989 | Marx | |
| 5,014,739 | A * | 5/1991 | Csaszar | 137/512.15 |
| 5,301,709 | A | 4/1994 | Gasaway | |

(Continued)

FOREIGN PATENT DOCUMENTS

AU    629566    3/1990

(Continued)

OTHER PUBLICATIONS

European Search Report for Application No. 07113310.2, mailed Nov. 21, 2008.

*Primary Examiner*—John Rivell
*Assistant Examiner*—Atif H Chaudry
(74) *Attorney, Agent, or Firm*—Ingrassia Fisher & Lorenz, P.C.

(57) ABSTRACT

A check valve stop assembly and method of retaining the check valve stop assembly in a check valve flow body without external fixation means, wherein the check valve stop assembly includes a threaded check valve stop insert and a check valve stop housing including a threaded interior sidewall that defines a void space therein. The check valve stop insert is inserted within the void space of the check valve stop housing by mating the threads of the check valve stop insert with those of the check valve stop housing. The check valve stop housing further includes an opening formed in the sidewall through which at least a portion of the check valve stop insert is accessible. The check valve stop insert that is accessible via the opening formed in the sidewall is either coupled to the check valve stop housing or mechanically deformed to prevent removal of the check valve stop insert from within the check valve stop housing.

20 Claims, 4 Drawing Sheets

U.S. PATENT DOCUMENTS

| | | | |
|---|---|---|---|
| 5,381,821 A * | 1/1995 | Muddiman | 137/454.2 |
| 5,392,810 A | 2/1995 | Cooper et al. | |
| 5,819,790 A | 10/1998 | Cooper | |
| 5,819,791 A | 10/1998 | Chronister et al. | |
| 6,237,625 B1 | 5/2001 | Randolph | |
| 7,201,142 B2 * | 4/2007 | Peffley et al. | 123/337 |
| 2004/0065370 A1 | 4/2004 | Gallego Buzon | |
| 2005/0109398 A1 | 5/2005 | Huang | |
| 2005/0175490 A1 | 8/2005 | Seto et al. | |
| 2007/0251512 A1 * | 11/2007 | Wallington | 123/572 |

FOREIGN PATENT DOCUMENTS

| | | |
|---|---|---|
| EP | 1336781 A1 | 8/2003 |
| JP | 01-176869 | 7/1989 |

\* cited by examiner

CHECK VALVE STOP ASSEMBLY AND METHOD OF RETENTION

TECHNICAL FIELD

The present invention relates to a check valve, and more particularly relates to a check valve including a check valve stop assembly that is retained within a flow body without the need for external fixation.

BACKGROUND

Non-return valves or check valves have long been known for allowing fluid flow in only one direction. Any reversal of the flow in the undesired direction results in stoppage or checking of the flow. This invention relates to a specific body construction and assembly for a check valve for carrying a fluid flow.

Typical prior art check valve assemblies are comprised of a flow section, a plurality of flappers, a stop tube for controlling the angle of opening of the flappers, and a plurality of vertical supports, commonly referred to as ears, for supporting the stop tube in its proper position. The stop tube is commonly held in place relative to the vertical supports through the use of an external fixation or retention device, such as a pin, or weld deposit about an end of the stop tube where it is inserted into and meets the vertical support.

In many applications, it is desirable to provide a check valve at one or more spaced locations in a pipe line or conduit for handling fluid flows. The check valve assures against back flow and provides a safety margin in the unlikely event of line breakage. These types of check valves, commonly referred to as insert check valves, preferably do not use an external mechanism be used for stop tube retention, thereby allowing for insertion of the check valve within confined space, such as a pipe, or the like.

In addition, in many applications, when a check valve is assembled using external methods to retain the stop tube assembly, heat becomes a factor and may result in the shrinking of the stop tube supports, causing critical deformation.

Hence, there is a need for a check valve including a check valve stop assembly that when retained within a plurality of vertical supports of the check valve flow body provides retention without the use of an external fixation or retention device. In addition, there is a need for a check valve stop assembly that is not susceptible to extreme heat conditions.

BRIEF SUMMARY

The present invention provides a check valve stop assembly comprising a check valve stop insert and a check valve stop housing. The check valve stop insert includes a main body and a protrusion. The main body having a substantially cylindrical shape, a first end, a second end, and an outer surface. The outer surface having a plurality of threads formed on at least a portion thereof. The protrusion extending from the main body second end. The check valve stop housing includes a threaded interior sidewall that defines a void space therein. The threads of the check valve stop insert are mated with the threads of the check valve stop housing to retain the check valve stop insert within the void space. The check valve stop housing further includes an opening formed in the sidewall through which at least a portion of the check valve insert main body is accessible. At least a portion of the check valve stop insert main body that is accessible via the opening formed in the sidewall is either coupled to the check valve stop housing or mechanically deformed to prevent removal of the check valve stop insert from within the check valve stop housing.

The present invention also provides a check valve flow body comprising a check valve flow section, a plurality of flappers, a plurality of substantially vertical stop supports and a check valve stop assembly. The check valve flow section including a plurality of flow openings. The plurality of flappers are mounted to the check valve flow section. The flappers are moveable relative to the check valve flow section to control the flow of a fluid through the plurality of flow openings. The plurality of substantially vertical stop supports extends substantially perpendicular to the check valve flow section. The plurality of substantially vertical stop supports include a first substantially vertical stop support spaced a distance from a second substantially vertical stop support. The check valve stop assembly is retained between the first substantially vertical stop support and the second substantially vertical stop support. The check valve stop assembly is comprised of a threaded check valve stop insert positioned within a check valve stop housing. The check valve stop assembly is retained between the first substantially vertical stop support and the second substantially vertical stop support without an external retention means.

The present invention also provides a method of retaining a check valve stop assembly within a check valve flow body. The method comprising the steps of providing a check valve stop housing including a sidewall having a substantially tubular shape. The sidewall including a plurality of threads on an interior surface and defining a void space therein. The check valve stop housing including an opening formed through the sidewall. Next, a check valve stop insert is provided having a first end and a second end. The check valve stop insert includes a plurality of threads formed on at least a portion thereof between the first end and the second end. Next, a check valve flow body is provided comprising a check valve flow section and a first substantially vertical support and a second substantially vertical support extending substantially perpendicular therefrom and spaced a distance from each other. Each of the plurality of substantially vertical supports including a opening formed there through. Next, the check valve stop housing is aligned between the plurality of substantially vertical supports. The check valve stop insert is next inserted into the opening of one of the check valve substantially vertical supports and into the check valve stop housing by rotating the check valve stop insert, thereby engaging the plurality of threads of the check valve stop insert and the check valve stop housing. The check valve stop insert when fully inserted extends from the opening of one of the substantially vertical supports through the check valve stop housing and into the opening of the second spaced apart substantially vertical support. Finally, the check valve stop insert is coupled to the check valve stop housing or at least a portion of the check valve stop insert accessible through the opening formed in the check valve stop housing is mechanically deformed to prevent removal of the check valve stop insert from within the check valve stop housing and the check valve stop assembly from within the check valve flow body.

Other independent features and advantages of the preferred apparatus and method will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
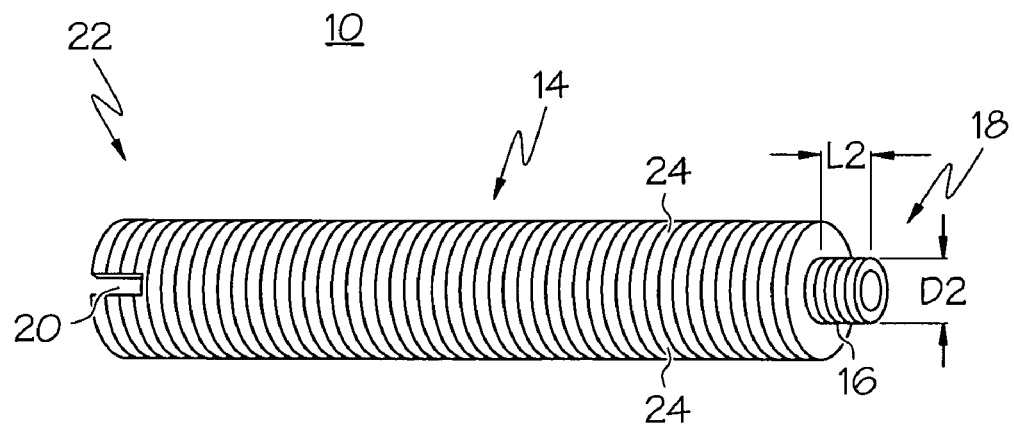
FIG. 1 is a perspective view of a check valve stop insert according to an embodiment of the invention.
Figure 2:
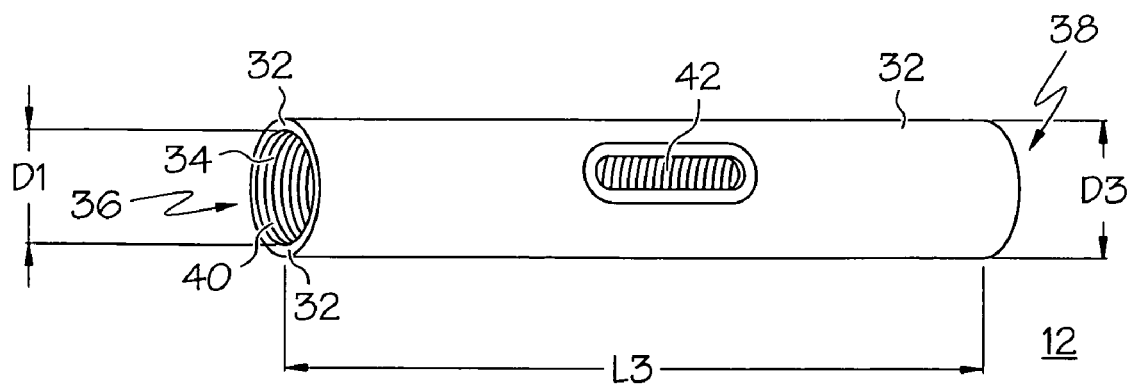
FIG. 2 is a perspective view of a check valve stop housing according to an embodiment of the invention.

FIGS. 1 and 2 are perspective views of a check valve stop insert 10 and a check valve stop housing 12, respectively, that form a check valve stop assembly according to the present invention. Referring more specifically to FIG. 1, illustrated is the check valve stop insert 10 having a generally cylindrical shaped main body 14 and having a protrusion 16 formed on a first end 18. The protrusion 16 aids in the retention of the check valve stop insert 10 within a check valve flow body (described presently) and may be threaded as illustrated herein. A cutout 20 is formed on an opposing second end 22 and aids in the insertion of the check valve stop insert 10 into the check valve stop housing 12.

The check valve stop insert main body 14 in this particular embodiment has a diameter D1 and length L1. The protrusion 16 has a diameter D2 and a length L2. It should be understood that the dimensions of the check valve insert 10 are dependent upon the specific check valve in which the check valve stop assembly will be used and the desired flapper angle (described presently) of the check valve. The check valve stop insert main body 14 additionally has a plurality of threads 24 formed on an outer surface to allow for insertion into the check valve stop housing 12. The check valve stop insert 10 is preferably formed of a high heat resistive metal, such as aluminum, steel, or an alloy. In an alternative embodiment, the check valve stop insert 10 may be formed of a plastic material, such as INCONEL®.

Referring now to FIG. 2, illustrated is the check valve stop housing 12, having a generally tubular shape wherein a sidewall 32 having a thickness defines therein a void space 34 extending from a first end 36 to a second end 38 of the check valve stop housing 12. The check valve stop housing 12 has an exterior dimension of D3, and an interior dimension, or void space 34 dimension of D1, equivalent to, or at least substantially equivalent to, dimension D1 of the check valve stop insert 10. The check valve stop housing 12 further has a dimension of L3 that is less than dimension L1 of the check valve stop insert main body 14 of FIG. 1. The check valve stop housing 12 has formed on an interior surface of the sidewall 32 a plurality of threads 40 that mate together with the threads 24 of the check valve stop insert main body 14 when positioned therein the check valve stop housing 12. The check valve stop housing 12 additionally has an opening 42 that is formed in, and extends through, the sidewall 32, providing physical access to the check valve stop insert 10 when inserted into the check valve stop housing 12.

Figure 3:
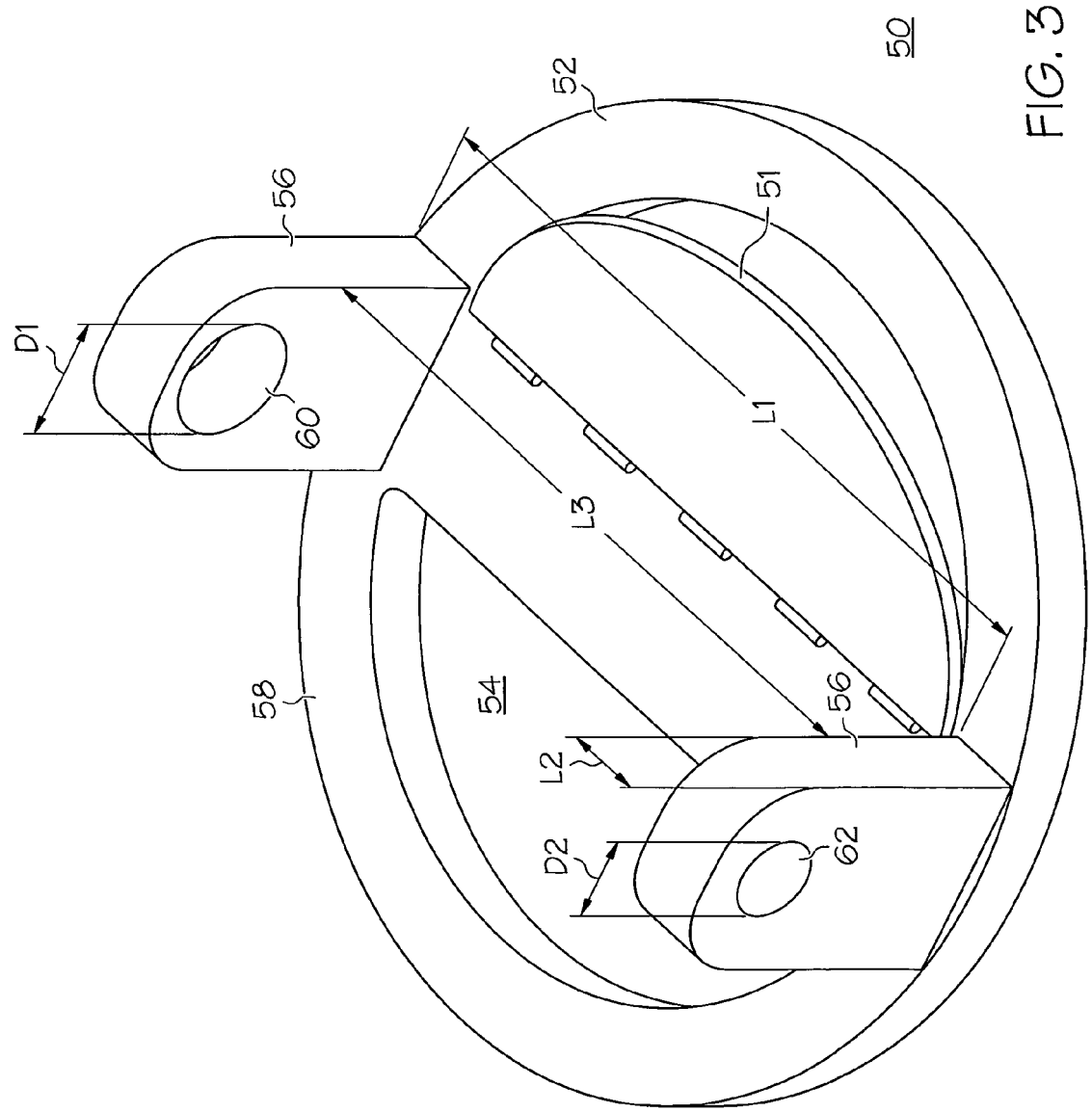
FIG. 3 is a perspective view of a check valve flow body according to an embodiment of the invention.

Referring now to FIG. 3, illustrated in perspective view is a portion of a check valve flow body, generally referenced 50. The check valve flow body 50 includes a flow section 52 onto which a plurality of moveable flappers 51 are hingeably mounted (of which only one is illustrated in a partially open position) thereby controlling the passage of a fluid through a plurality of openings 54 formed in the check valve flow section 52. A plurality of vertical stop supports 56, or ears, extend at least substantially perpendicular to a surface 58 of the flow section 52. The stop supports 56 each have an opening formed therein to allow for the positioning and retention of the check valve stop assembly, and more particularly the first end 18 and second end 22 of the check valve stop insert 10. More specifically, a first opening 60 is formed in one of the vertical stop supports 56 having a dimension D1 corresponding to dimension D1 of the check valve stop insert main body 14, and allowing therefore the insertion of the check valve stop insert 10 there through. The second vertical stop support 56 has an opening 62 formed there through having a dimension D2 corresponding to dimension D2 of the check valve stop insert protrusion 16. The vertical supports 56 are spaced apart a distance that is at least substantially equivalent to dimension L3 of the check valve stop housing 12, thereby allowing for a close tolerance fit of the check valve stop housing 12 there between. The opening 62 of the vertical stop support 56 into which the protrusion 16 of the check valve stop insert 10 is positioned has a second dimension L2 that is at least substantially equivalent to dimension L2 of the protrusion 16. These dimensional equivalents, or substantial equivalents, provide proper positioning of the check valve stop assembly into the check valve flow body 50.

Figure 4:
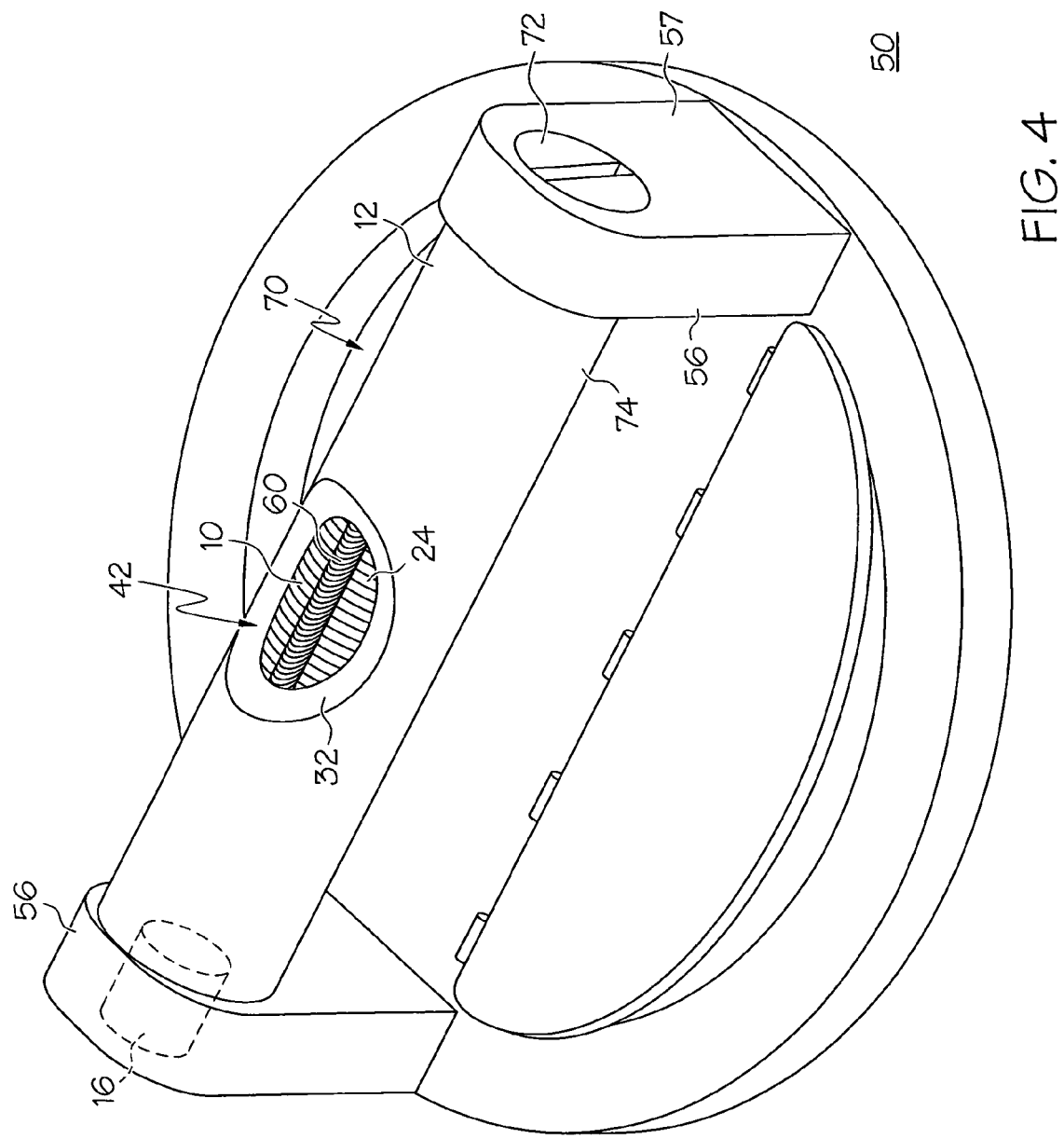
FIG. 4 is a perspective view of a check valve flow body illustrating in shadow positioning of the check valve stop assembly therein according to an embodiment of the invention.

Referring now to FIG. 4, illustrated in perspective view is a portion of the check valve flow body 50 having the check valve stop assembly 70 positioned and retained therein according to the present invention. The check valve stop assembly 70 is comprised of the check valve stop insert 10 of FIG. 1, positioned within the check valve stop housing 12 of FIG. 2. During assembly of the check valve stop assembly 70, the check valve stop housing 12 is first positioned between the vertical supports 56. Next, the first end 18 of the check valve stop insert 10 is positioned through the opening 60 and within the check valve stop housing 12 by rotating, so as to screw the check valve stop insert 10 into the check valve stop housing 12. This rotating action, because the threads 24 of the check valve stop insert main body 14 mate with the threads 40 of the check valve stop housing 12, positions the check valve stop insert 10 within the check valve stop housing 12. The check valve stop insert 10 may be rotated with a screwdriver using the cutout 20 in a generally well known manner.

As shown in phantom in FIG. 4, when the check valve stop insert 10 is properly positioned, the protrusion 16, formed on the check valve stop insert 10, is positioned within the opening 62 of the vertical support 56. In addition, the second end 22 of the check valve stop insert 10 is at least substantially flush with an outer surface 57 of the vertical support 56, or resides partially within opening 60. This substantially flush positioning allows for the insertion of the check valve flow body 50 within a pipe having close tolerances.

Figure 5:
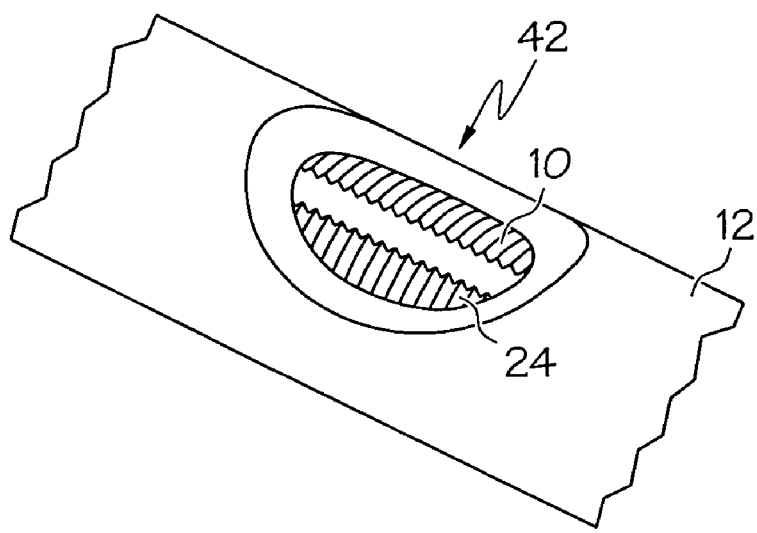
FIG. 5 is a perspective view of a portion of the check valve stop assembly according to an embodiment of the invention.
Figure 6:
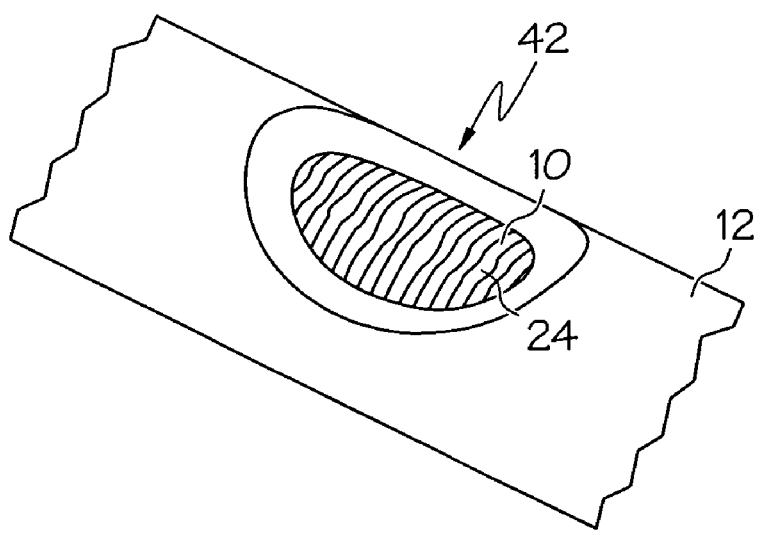
FIG. 6 is a perspective view of a portion of the check valve stop assembly according to an embodiment of the invention.

As illustrated in FIG. 4, during the assembly process, the check valve stop insert main body 14 is partially accessible through the opening 42. The opening 42 further allows for physical coupling or deformation of the check valve stop insert 10. Subsequent to the proper positioning of the check valve stop insert 10 within the check valve stop housing 12, the threads 24 of the check valve stop insert main body 14 are manipulated in such a manner as to retain the check valve stop insert 10 within the check valve stop housing 12 by restricting any further movement of the check valve stop insert 10. More specifically, in this particular embodiment, a weld bead 60 is deposited on the portion of the check valve stop insert 10, and more particularly the plurality of threads 24, accessible through the opening 42 in the sidewall 32. The weld bead 60 causes a mechanical deformation of check valve stop insert 10 and prevents its movement. The weld bead 60 also retains the check valve stop insert 10 within check valve stop housing 12. In an alternative embodiment, the threads 24 may have their alignment altered or destroyed by mechanical deformation, such as the removal of a portion of the threads 24, as illustrated in FIG. 5, or realignment of a portion of the threads 24 as illustrated in FIG. 6. The mechanical deformation of threads 24 prevents movement of the check valve stop insert 10 within the check valve stop housing 12, thereby resulting in check valve stop assembly 70 retention within the flow body 50.

In contrast to prior check valve stop assemblies, in this particular embodiment the deformation of the threads 24 of the check valve stop insert 10 via opening 42 provides the check valve stop assembly 70 retention without any additional external welds or pins. More specifically, this means of retaining the check valve stop insert 10 provides retention of the check valve stop assembly 70 as a part of the check valve flow body 50 without any external fixation that would potentially prevent insertion of the check valve flow body 50 within a pipe, or the like. In addition, this means of retaining the check valve stop assembly 70 is not susceptible to high temperatures that would otherwise melt pins or external welds when used as retention means.

Thus, the check valve stop assembly 70 of the present invention includes the check valve stop insert 10 that is positioned within the check valve stop housing 12 using mating threads 24 and 40. The check valve stop insert 10 includes the main body 14 and the protrusion 16, having a substantially cylindrical shape, a first end 18, a second end 22, and an outer surface, the outer surface having a plurality of threads 24 formed on at least a portion thereof. The protrusion 16 at the first end 18 of the check valve stop insert 10 and a portion of the check valve stop insert 10 at a second end 22 extend into the plurality of openings 60 and 62 formed in the plurality of supports 56 extending substantially vertical from the check valve flow section 52. After the check valve stop insert 10 is positioned within the check valve stop housing 12, the check valve stop insert main body 14 is coupled to the check valve stop housing 12 by the weld bead 60 deposited on the threads 24, or the threads 24 of the check valve stop insert 10 accessible through the opening 42 formed in the sidewall 32 of the check valve stop housing 12 are mechanically deformed so as to prevent the movement of the check valve stop insert 10 within the check valve stop housing 12 and retain the check valve stop assembly 70 within the flow body 50.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A check valve stop assembly comprising:
   a check valve stop insert including a main body, a protrusion, and a cutout, the main body having a substantially cylindrical shape, a first end, a second end, and an outer surface, the outer surface having a first plurality of threads formed on at least a portion thereof, the protrusion formed on the main body second end, the protrusion having a second plurality of threads formed thereon, and the cutout formed on the main body first end; and
   a check valve stop housing including a threaded interior sidewall that defines a void space therein, the first and second pluralities of threads of the check valve stop insert mated with the threads of the check valve stop housing to retain the check valve stop insert within the void space, the check valve stop housing further including an opening formed in the sidewall through which at least a portion of the check valve insert main body is accessible;
   wherein at least a portion of the check valve stop insert main body that is accessible via the opening formed in the sidewall is either coupled to the check valve stop housing or mechanically deformed to prevent removal of the check valve stop insert from within the check valve stop housing.

2. The assembly of claim 1, wherein the threads of at least a portion of the check valve stop insert main body that is accessible via the opening formed in the sidewall of the check valve stop housing are mechanically deformed by destroying mating of the threads of the check valve stop insert main body and the check valve stop housing.

3. The assembly of claim 2, wherein the first plurality of threads are mechanically deformed by removing portions of the threads.

4. The assembly of claim 2, wherein the first plurality of threads are mechanically deformed by realigning the threads.

5. The assembly of claim 2, wherein the main body is coupled to the check valve stop housing by a weld bead deposited on the threads.

6. The assembly of claim 1, wherein the check valve stop insert and the check valve stop housing are formed of a heat resistant metal.

7. The assembly of claim 6, wherein the check valve stop insert and the check valve stop housing are formed of a material chosen from the group consisting of:
   aluminum, steel, and an alloy.

8. The assembly of claim 1, wherein the check valve stop insert and the check valve stop housing are formed of a heat resistant plastic.

9. A check valve flow body comprising:
   a check valve flow section including a plurality of flow openings;
   a plurality of flappers, mounted to the check valve flow section, the flappers moveable relative to the check valve flow section to control the flow of a fluid through the plurality of flow openings;
   a plurality of substantially vertical stop supports extending substantially perpendicular to the check valve flow section, the plurality of substantially vertical stop supports including a first substantially vertical stop support spaced a distance from a second substantially vertical stop support; and a check valve stop assembly retained between the first substantially vertical stop support and the second substantially vertical stop support;

wherein the check valve stop assembly is comprised of a threaded check valve stop insert positioned within a check valve stop housing, the threaded check valve stop insert comprising a threaded main body and a threaded protrusion formed on an end thereof; and wherein the check valve stop assembly is retained between the first substantially vertical stop support and the second substantially vertical stop support without an external retention means.

10. The assembly of claim 9, wherein the check valve stop housing further includes an opening formed in a sidewall through which at least a portion of the threaded check valve insert is accessible.

11. The assembly of claim 10, wherein at least a portion of the threaded check valve stop insert that is accessible via the opening formed in the check valve stop housing is either coupled to the check valve stop housing or mechanically deformed to retain the check valve stop insert within the check valve stop housing.

12. The assembly of claim 11, wherein at least a portion of the threaded check valve stop insert is mechanically deformed by removing portions of a plurality of threads to destroy mating of the threaded check valve stop insert and the check valve stop housing.

13. The assembly of claim 11, wherein at least a portion of the threaded check valve stop insert is mechanically deformed by realigning a plurality of threads to destroy mating of the threaded check valve stop insert and the check valve stop housing.

14. The assembly of claim 11, wherein the threaded check valve stop insert is coupled to the check valve stop housing by a weld bead deposited on a plurality of threads of the threaded check valve stop insert.

15. A method of retaining a check valve stop assembly within a check valve flow body comprising;

providing a check valve stop housing including a sidewall having a substantially tubular shape, the sidewall including a plurality of threads on an interior surface and defining a void space therein, the check valve stop housing including an opening formed through the sidewall;

providing a check valve stop insert having a first end and a second end, the check valve stop insert including a first plurality of threads formed on at least a portion thereof between the first end and the second end, the check valve stop insert further including a protrusion formed on the second end, the protrusion including a second plurality of threads formed thereon;

providing a check valve flow body comprising a check valve flow section and a first substantially vertical support and a second substantially vertical support extending substantially perpendicular therefrom and spaced a distance from each other, each of the plurality of substantially vertical supports including a opening formed there through;

aligning the check valve stop housing between the plurality of substantially vertical supports;

inserting the check valve stop insert into the opening of one of the check valve substantially vertical supports and into the check valve stop housing by rotating the check valve stop insert, thereby engaging the first and second pluralities of threads of the check valve stop insert and the check valve stop housing, the check valve stop insert when fully inserted extending from the opening of the first substantially vertical support through the check valve stop housing and into the opening of the second spaced apart substantially vertical support and retained between the first substantially vertical support and the second substantially vertical support without an external retention means; and coupling the check valve stop insert to the check valve housing or mechanically deforming at least a portion of the check valve stop insert accessible through the opening formed in the check valve stop housing to prevent removal of the check valve stop insert from within the check valve stop housing and the check valve stop assembly from within the check valve flow body.

16. The method of claim 15, wherein the check valve stop insert includes a protrusion formed at the second end, the check valve stop insert when fully inserted into the check valve stop housing engaging the protrusion into the opening formed in one of the substantially vertical supports.

17. The method of claim 15, wherein the step of coupling the check valve insert to the check valve housing includes the step of depositing a weld bead onto the portion of the first plurality of threads to prevent removal of the check valve stop insert from within the check valve stop housing.

18. The method of claim 15, wherein the step of mechanically deforming at least a portion of the check valve stop insert includes the step of removing at least a portion of the first plurality of threads of the check valve stop insert to prevent removal of the check valve stop insert from within the check valve stop housing.

19. The method of claim 15, wherein the step of mechanically deforming at least a portion of the check valve stop insert includes the step of realigning at least a portion of the first plurality of threads of the check valve stop insert to destroy the mating alignment of the threads and preventing removal of the check valve stop insert from within the check valve stop housing.

20. The method of claim 15, wherein the step of inserting the check valve stop insert into an opening of one of the check valve substantially vertical supports and into the check valve stop housing includes the step of inserting the check valve stop insert until the plurality of ends of the check valve stop insert are substantially flush with an outside surface of each of the substantially vertical supports.

* * * * *